United States Patent [19]

Hilbertz et al.

[11] Patent Number: 5,543,034
[45] Date of Patent: Aug. 6, 1996

[54] METHOD OF ENHANCING THE GROWTH OF AQUATIC ORGANISMS, AND STRUCTURES CREATED THEREBY

[76] Inventors: Wolf H. Hilbertz, Earlscliff, Ceannchor Road, Baily, Co. Dublin, Ireland; Thomas J. Goreau, 324 N. Bedford Rd., Chappaqua, N.Y. 10514

[21] Appl. No.: 519,897

[22] Filed: Aug. 28, 1995

Related U.S. Application Data

[63] Continuation-in-part of Ser. No. 374,993, Jan. 19, 1995, abandoned.

[51] Int. Cl.$^6$ ............................................. C02F 1/461
[52] U.S. Cl. ..................... 205/688; 205/701; 205/742; 204/DIG. 6
[58] Field of Search ................................. 205/688, 701, 205/742; 204/DIG. 6

[56] References Cited

U.S. PATENT DOCUMENTS 5,395,491  3/1995  Hasvold ................................. 205/701

*Primary Examiner*—Arlin S. Phasge
*Attorney, Agent, or Firm*—Parkhurst Wendel & Burr

[57] ABSTRACT

A method of enhancing growth of aquatic organisms in an aqueous mineral-containing electrolyte such as sea water which comprises:

(a) installing a cathode and an anode in the electrolyte,
(b) applying a steady, pulsed or intermittent direct electric current across the cathode and the anode to effect electrolysis,
(c) providing accreted mineral material on the cathode,
(d) recruiting aquatic organisms on or in the vicinity of the cathode, and
(e) creating by electrolysis conditions of higher alkalinity in the electrolyte in the vicinity of the cathode than in the electrolyte remote from the cathode to cause growth of the aquatic organisms in the conditions in the vicinity of the cathode, the placement of the anode being done in such a way as to minimize the effects of hydrochloric acid produced at the anode.

The method is particularly described with reference to the growth of organisms which deposit calcareous substances, such as corals, for the creation of artificial reefs or coastal defence structures. The invention is also useful in mariculture facilities, such as oyster-producing installations, where the shellfish or other grown organism is harvested.

13 Claims, 5 Drawing Sheets

METHOD OF ENHANCING THE GROWTH OF AQUATIC ORGANISMS, AND STRUCTURES CREATED THEREBY

CROSS-REFERENCE TO RELATED APPLICATION

This application is a Continuation-In-Part of application Ser. No. 08/374,993 filed on 19 Jan., 1995, now abandoned.

BACKGROUND OF THE INVENTION (a) Field of the Invention

This invention relates to a method of enhancing the growth of aquatic organisms and to structures created thereby and more particularly, it relates to the creation of artificial reefs, coastal defence structures and aquaculture facilities which consist of man-made and biologically produced materials, the latter having enhanced growth rates. In the case of aquaculture facilities, more particularly mariculture facilities, such as oyster-producing installations, the shellfish or other grown organism is harvested.

(b) Description of the Related Art

Sea water contains nine major elements: sodium, magnesium, calcium, potassium, strontium, chlorine, sulphur, bromine and carbon.

These elements comprise more than 99.9% of the total dissolved salts in the ocean (see Milliman et. al., Marine carbonates, Springer Verlag New York 1974; Sverdrup, et. al. The Oceans: Their Physics, Chemistry and General Biology, Prentiss-Hall, Inc., in New Jersey 1942; and Culkin and Goldberg in Volume 1, Chemical Oceanography, pp. 121–196, Academic Press, London 1965). The constancy of the ratios of the major elements throughout the oceans has long been well known (Dittmar, Challenger Reports, Physics and Chemistry, pp. 1–251, 1884).

In 1940 and 1947, G. C. Cox was issued U.S. Pat. Nos. 2,200,469 and 2,417,064, outlining methods of cathodic cleaning and protection of metallic surfaces submerged in seawater by means of a direct electrical current. During the cleaning process, a coating is also formed cathodically, consisting of magnesium and calcium salts (Eichoff and Shaw, Corrosion, No. 4, pp. 363–473, 1948). If these coatings are hard and continuous, they afford a considerable degree of corrosion protection to the enclosed metal (see Humber, Corrosion, No. 4, pp. 358–370, 1948, and Corrosion, Volume 4, No. 9, pp. 292–302, 1949).

Lower marine organisms utilize the minerals in solutions surrounding them to build structural formations. Mollusk shells, for example, are generally composed of calcium carbonate crystals enclosed in an organic matrix. A significant proportion of the soluble protein in the matrix is composed of a repeating sequence of aspartic acid separated by either glycine or serine (see Jope in Volume 26, Comprehensive Biochemistry, p. 749, Elsevier, Amsterdam, 1971). This sequence, comprising regular repeating negative charges, could bind $Ca^{2+}$ ions and thus perform an important function in mineralization of the template (Weiner and Hood, Volume 190, Science, pp. 987–989, 1975).

The present inventors have studied the electrodeposition of materials from seawater over a considerable number of years (see U.S. Pat. Nos. 4,461,684, 4,440,605 and 4,246,075, all of Hilbertz).

In AMBIO—a Journal of the Human Environment, published by the Royal Swedish Academy of Sciences, Vol. 21 No. 2, April 1992, page 126–129, Hilbertz, surveyed existing resources for the operation of mineral accretion processes and discussed similarities in biogenic calcium carbonate deposition. Electrolytically precipitated limestone and material consisting of artificial limestone and hard coral skeletons were proposed as a sink for carbon and for use as building materials. It was postulated that solar-generated building material (SBM) could be used to stimulate reef and shell-building organisms, creating artificial reef communities. An illustration was included of an early experiment to graft hard coral onto SBM. A branch of elkhorn coral (*Acropora palmata*) was covered by a cathode of galvanized wire mesh. A single anode was placed nearby. Both electrodes were connected to a small photovoltaic cell above sea level, causing mineral accretion (MA) to envelop the coral branch. After completed accretion (15 days later) coral began to colonize the SBM, starting at the coral sided fringe of the cathode covered with MA. Similar investigations were in progress involving multiple specimens of several live coral species which were attached to MA surfaces without electricity and cathodes producing MA. The coral specimens were being monitored to determine the effects of electric fields, hydrogen evolution at the cathode, pH of the surrounding electrolyte, ion density in the vicinity of the cathode, and other factors.

The article was based on a small-scale trial using an existing coral and pointed out the need for further experimental observations. In particular, no comparison was made of coral growth rates as compared to other environments and no reasons were given to indicate that growth of coral or other organisms would in fact be stimulated by using the SBM substrate.

Schuhmacher et al in *Bulletin of Marine Science*, 55(2–3); 627–679, 1994 describe integrated electrochemical and biogenic deposition of hard material to provide a substrate for hard sea-bottom settlers. Brucite, aragonite and other materials derived from the ambient seawater are precipitated on a cathode of the shape desired. An iterative pattern of direct-current phases and dead phases permits the calcareous matter to be deposited in an integrated fashion by physical precipitation and by secretion by sessile organisms. During the dead phase the substrate is colonized by a diverse community of the type which occurs on natural hard substances. However the experiments showed that simultaneous electrochemical and biogenic deposition of hard material was not possible. A dead phase of some four weeks was necessary. The present inventors consider that the lack of success in achieving growth of the lime-secreting organisms during electrodeposition was due to the location of the anode as shown in FIG. 3 on page 674 of the reference. The placing of the anode inside a cylindrical or conical cathode would have the result that hydrochloric acid generated at the anode would pass the cathode and would adversely affect living organisms in the vicinity of the cathode.

It is an object of the present invention to provide artificial reefs which are superior to traditional artificial reefs like those consisting of old cars, sunken ships, used automobile tires and precast plastic and concrete modules or elements.

It is a further object of the invention to grow shore defence structures like groins and sea walls economically using biological building materials in connection with the mineral accretion process.

It is another object of the invention to significantly increase the yield of mariculture crops or catches such as oysters, cockles and other shellfish, and to facilitate the farming of corals for the sea aquarium trade in order to reduce the exploitation of natural reef resources.

While fish will hide behind any large sea bottom object, corals and most natural reef organisms will not settle and grow on and around conventional artificial reefs until many years or decades have passed. The reason appears to be that such reefs leach toxic chemicals and trace metals from cement, steel, plastics and paint for long after they are put in place, which inhibits the settling of corals and other organisms. Most of these traditional artificial reefs are biologically barren and do not produce genuine coral reef communities. Rather than organically becoming part of the environment, these underwater structures become dangerous projectiles in the event of hurricanes. After Hurricane Andrew hit Southern Florida, a survey of traditional articial reefs in the area revealed that not a single one remained intact. All moved, and while from one to many fragments were found of some, many vanished entirely.

The present inventors have found that on accreted artificial reefs and shore protection structures, an enormous variety of sea life is attracted, including young settling corals, juvenile fish, moray eels, sea urchins, sea cucumbers, crabs, squid, shrimps, bivalves, and even dolphins. The growth of corals on or near these structures is accelerated.

SUMMARY OF THE INVENTION

The present invention provides a method of enhancing growth of aquatic organisms in an aqueous mineral-containing electrolyte which comprises:

(a) installing a cathode and an anode in the electrolyte, (b) applying a steady, pulsed or intermittent direct electric current across the cathode and the anode to effect electrolysis, (c) providing accreted mineral material on the cathode, (d) recruiting aquatic organisms on or in the vicinity of the cathode, and (e) creating by electrolysis conditions of higher alkalinity in the electrolyte in the vicinity of the cathode than in the electrolyte remote from the cathode to cause growth of the aquatic organisms in the conditions in the vicinity of the cathode, the placement of the anode being done in such a way as to minimize the effects of hydrochloric acid produced at the anode.

Preferably the electrolyte is selected from sea water, brackish water or brine.

In one embodiment, the accreted mineral material is deposited on the cathode by the electrolysis.

In a second embodiment, the accreted mineral material is pre-fabricated material which has been electrodeposited previously and which is fixed to the cathode.

According to one aspect of the invention, the cathode is seeded with the aquatic organisms.

According to a further aspect of the invention, the cathode is settled naturally by the aquatic organisms.

In one preferred embodiment, the aquatic organisms are organisms which deposit calcareous substances.

Preferably, the organisms are selected from corals and calcareous algae or from bivalves, worms, protozoans, sponges and crawling organisms including snails and echinoderms. The organisms may also include organisms which use the artificial reef structures as a home or hiding place, even though they do not grow attached to it, such as lobsters, crabs and fish.

In one aspect, the invention provides a method of enhancing growth of aquatic organisms in an aqueous mineral-containing electrolyte which comprises:

(a) installing a cathode and an anode in the electrolyte, (b) applying a steady, pulsed or intermittent direct electric current across the cathode and the anode to effect electrolysis, (c) providing accreted mineral material on the cathode, (d) recruiting aquatic organisms on or in the vicinity of the cathode, and (e) creating by electrolysis conditions of relatively high alkalinity and relatively high electron availability at the cathode (compared to the electrolyte remote from the cathode) so that the aquatic organisms grow in these conditions.

In a further aspect, the invention provides a method of creating conditions of increased electron availability for the biochemical electron transport chain of aquatic organisms in an aqueous mineral-containing electrolyte which comprises:

(a) installing a cathode and an anode in the electrolyte, (b) applying a steady, pulsed or intermittent direct electric current across the cathode and the anode to effect electrolysis, (c) providing accreted mineral material on the cathode, (d) recruiting aquatic organisms on or in the vicinity of the cathode, and (e) creating by electrolysis conditions of higher alkalinity in the electrolyte in the vicinity of the cathode than in the electrolyte remote from the cathode to cause growth of the aquatic organisms in the conditions in the vicinity of the cathode, the placement of the anode being done in such a way as to minimize the effects of hydrochloric acid produced at the anode.

In a particularly preferred aspect, the invention provides a method for the construction, repair and maintenance of structures in an aqueous mineral-containing electrolyte which comprises:

(a) installing a cathode and an anode in the electrolyte, (b) applying a steady, pulsed or intermittent direct electric current across the cathode and the anode to effect electrolysis, (c) providing accreted mineral material on the cathode, (d) recruiting aquatic organisms which deposit calcareous substances on or in the vicinity of the cathode.

(e) creating by electrolysis conditions of higher alkalinity in the electrolyte in the vicinity of the cathode than in the electrolyte remote from the cathode to cause growth of the aquatic organisms in the conditions in the vicinity of the cathode, the placement of the anode being done in such a way as to minimize the effects of hydrochloric acid produced at the anode, and (f) accumulating deposited calcareous substances on or in the vicinity of the cathode to form, repair or maintain a structure on or in the vicinity of the cathode.

The present invention provides inter alia a method of creating artificial reefs and coastal defence structures of any shape and size with biological components from the time of soaking. The living organisms may be recruited from the surroundings of the structures. In the case of aquaculture facilities, larvae and spat, juvenile as well as mature organisms can be provided from other sources. In particular, the present invention provides a method of rapidly growing reef and other communities as well as other aquaculture stock on or in the vicinity of electrodeposited substrate in a volume of electrically charged electrolyte whose chemical state has been altered.

In accordance with the present invention, while a mineral coating on cathodic material is obtained by accretion through the electrodeposition of dissolved minerals, or by the application of prefabricated material, electric charges and chemical changes in the electrolyte cause recruitment of marine organisms and subsequently exceptionally fast growth rates of these organisms.

According to one aspect, the method of the present invention for construction and maintenance of artificial reefs, shore defence structures and mariculture facilities incorporating accelerated growth of marine organisms involves:

1. Soaking anode(s) and cathode(s) in a volume of electrolyte and the application of a steady or pulsed direct electric current, which source is for example the power grid, photovoltaic arrays, or wind-driven generators, thereby electrifying the electrolyte.
2. Inducing chemical changes in the electrolyte.
3. Deposition of limestone/magnesium-containing minerals at the cathode.
4. Recruitment and/or stocking of organisms like coral, coralline algae, bivalves, snails and shrimp on or in the vicinity of the cathode.
5. The possible attraction of large numbers of juvenile and adult fish and other marine organisms.
6. The possibility of supply of calcareous sand from algae and break-up of stony corals.
7. The possibility of self-cementation to the sea floor, contributing to permanent shore protection.
8. The ability to break waves and to slow or redirect ocean currents, contributing to permanent shore protection.
9. The continued thriving of reef communities under water quality conditions which have deteriorated to the point of killing corals in the immediate vicinity.
10. The ability for self-repair through continued or reapplied electrical current.
11. The possibility of harvesting of corals, shellfish, lobster and other organisms.
12. The possibility of harvesting of the electrodeposited substrate.
13. The possibility of modification and reapplication of harvested electrodeposited substrate.
14. The option of artificial illumination during night time to attract food.

Preferably, the electrolyte utilized is sea water, brackish water, or brine. However, any mineral-containing liquid may be used. Normally the liquid is also chlorine-containing.

The method of the present invention can be applied in open water or volumes of water in containers.

Also, in carrying out the foregoing invention, anode placement should be done in such a way as to minimize or avoid the effects of hydrochloric acid which is produced at the anode.

BRIEF DESCRIPTION OF THE DRAWINGS

A written description setting forth the best mode presently known for carrying out the present invention, and the manner implementing and using it, is provided by the following detailed description of illustrative embodiments and examples, which refer to the accompanying drawings wherein.

DETAILED DESCRIPTION OF THE INVENTION

The deposition and calcification of minerals in the environment is made possible by the fact that the medium in which they are suspended, water, is an ampholyte—a substance which can behave as an acid or a base—making it the univeral solvent. This unique quality is most simply illustrated by the structural and destructural system of caverns. When water contains carbon dioxide, which combines with water to make carbonic acid, materials are dissolved. When carbon dioxide escapes, water becomes a base and materials are precipitated as stalactites and stalagmites. Similar non-living processes occur throughout the environment in cycles of deposition and reclamation.

Electrolytic processes can be utilized to selectively precipitate materials onto suitable surfaces. A certain electrical potential between electrodes will deposit negative ions on the anode and positive ions on the cathode. During the electrodeposition process, there are three methods by which material can potentially be accreted on the cathode:

1. concentration gradients;
2. ionic attraction; and
3. electric migration.

Figure 1:
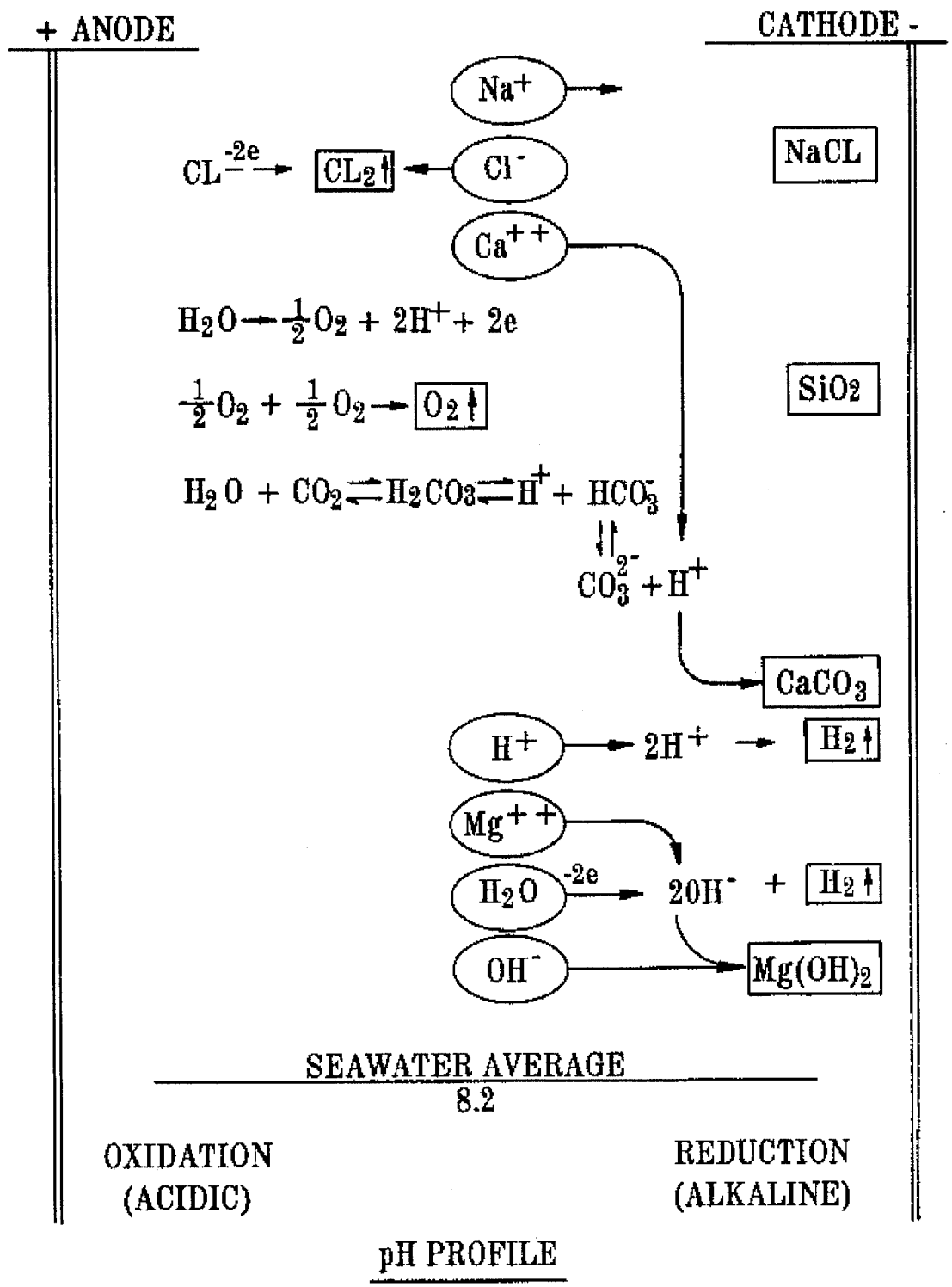
FIG. 1 depicts a theoretical qualitative model for the electrochemical processes involved in the accretion of minerals.

Although concentration gradients are most likely the cause of accretion, combinations of the three methods cannot be precluded. The basic model of the electrochemical reactions in a greatly simplified form is diagrammed in FIG. 1. In FIG. 1, the rectangular boxes represent either the mineral compounds precipitated from solution by the above methods, or the gases which are evolved. The arrows represent possible pathways of reactions according to the pH profile.

In addition to attracting ions, electrolysis of seawater produces heat at the electrode surfaces. The resistance is greatest at these surfaces; the temperature is, therefore, greater and the pH will rise. At first, the thermal decomposition removes the carbonic acid ($H_2CO_3$) allowing carbon dioxide ($CO_2$) to escape, which causes the hydrogen carbonate-carbonate equilibrium to shift to the carbonate side. The increased carbonate concentration, with increase in temperature and salinity, will increase the ionic product of calcium carbonate crystals, and induce precipitation. However, as the solution becomes more alkaline (at pH greater than 9), the ionic product of a brucite [$Mg(OH)_2$] will exceed the solubility product and brucite as well as the carbonates will be precipitated.

A. General discussion

The oceans hold in solution a great material resource, acting as a link in the continual and vital cycle of material from land to sea. Each year, rivers contribute $2.73 \times 10^9$ metric tons of newly-dissolved solids. In the 70.8% of the earth's surface which is covered by water, there are over 60 quadrillion tons of mineral resources (Wenk, E., Jr., "The Physical Resources of The Ocean", The Ocean, W. J. Freeman & Co. 1969).

Apart from oxygen and hydrogen, one cubic mile of seawater contains:

chlorine—89 500 000 t
sodium—49 500 000 t
magnesium—6 125 000 t
sulphur—1 880 000 t
calcium—1 790 000 t
potassium—1 609 000 t
bromine—306 000 t
carbon—132 000 t and 51 other minerals and elements.

The utilization of processes similar to those exhibited by the structural mechanisms of living organisms and in non-living environments, such as caverns, provides a mineral accretion technology which involves the deposition and calcification of minerals in solution for organic growth purposes. That is, through electrolytic processes (diagenesis) and subsequent biological phasing (biogenesis), materials are electrodeposited onto conductive forms and are settled by biological organisms which are recruited from the environment or imported.

Typical mineral phases deposited are calcite, aragonite, and brucite, and may also include high-magnesian calcite, dolomite, nesquehonite, hydromagnesite, huntite, and amorphous phases of the aforesaid minerals, as many of these may be meta-stable under the conditions applied.

B. Electric fields and chemical changes in the electrolyte promote growth of the organisms.

The cathodic form defines the initial shape of all structures and is the scaffolding on which, and in whose vicinity, accelerated growth of organisms takes place. When required, it is designed, anticipating certain electrodeposition rates of minerals and growth of organisms, to withstand wave and ocean current forces.

However, it is the electrical current applied which causes accelerated growth of organisms, mainly by changing the chemical composition of the electrolyte. The process of electrodeposition, through electrolysis, generates high pH (alkaline) and high electron (reducing) conditions at the cathode, causing chemical deposition of calcareous material on the cathode and providing the natural mineral substrate for settlement and growth of organisms which grow skeletons and shells made of limestone, or parts of limestone. These organisms include mobile fauna, sessile fauna and sessile-flora, among others:

1. Attached organisms such as all the stony corals (coelenterates including scleractinian hexacorallia, hydrozoans, and octocorallia), the articulated and encrusting calcareous algae (including chlorphyceae and rhodophyceae), bivalves (pelecyopoda), calcareous worms (serpulid and sebellid polychaeta), protozoans (foraminifera), and sponges (calcispongiae).

2. Crawling organisms including snails (gastropoda), and all classes of echinoderms (echinoidea, holothuroideae, asteroideae, ophiuroideae, and crinoideae).

The method of the invention preferably elevates the pH in the electrolyte medium adjacent to the cathode to a level at least 0.1 pH units or more above that value at which calcite is in equilibrium with the electrolyte in the absence of electrical currents. This value is above that which can naturally occur in the electrolyte medium unless all calcium carbonate has already been precipitated out. The equilibrium pH is a function of the chemical composition of the electrolyte, temperatures and pressure. The table below gives the equilibrium pH in shallow sea water for calcite at various temperatures (p 89, N. M. Garrels & G. L. Christ, 1985, Solutions, Minerals, and Equilibria, Harper & Row, New York), along with the minimum pH produced at the cathode by the method of the invention.

| Temperature (°C.) | Equilibrium pH | pH at Cathode Surface |
| --- | --- | --- |
| 0 | 8.02 | greater than 8.12 |
| 5 | 8.09 | greater than 8.19 |
| 10 | 8.15 | greater than 8.25 |
| 15 | 8.22 | greater than 8.32 |
| 20 | 8.28 | greater than 8.38 |
| 25 | 8.34 | greater than 8.44 |
| 30 | 8.40 | greater than 8.50 |
| 40 | 8.52 | greater than 8.62 |
| 50 | 8.63 | greater than 8.73 |

Although the present invention is not limited by any theory, the inventors believe that the organisms grow their limestone skeletons at an elevated rate when attached to or in the vicinity of the cathode because alkaline conditions convert dissolved sea water bicarbonate ions into carbonate ions, causing supersaturation of calcium carbonate, resulting in the deposition of limestone materials (aragonite and calcite, containing magnesium).

The inventors also consider that organisms in the vicinity of the cathode may be more efficient at uptake and internal transport of essential dissolved cations such as calcium, magnesium, and other dissolved elements because of the increased availability of electrons for co-transport or counter-transport across cell membranes. Electron availability or electron density is related to the reducing conditions at or in the vicinity of the cathode and is a function of the applied potential (voltage) and current (amperage) at the cathode.

Furthermore, the inventors believe that organisms in the vicinity of the cathode, both with and without limestone skeletons, may grow more rapidly because additional electrons are available to provide energy to cells through the biochemical electron transport chain, increasing their metabolic efficiency since less organic matter needs to be oxidized in order to provide electrons to provide biochemical energy for adenosine triphosphate (ATP) production. ATP is a nucleotide that is of fundamental importance as a carrier of chemical energy in all living organisms. It consists of adenine linked to D-ribose (adenosine); the D-ribose component bears three phosphate groups, linearly linked together by covalent bonds. These bonds can undergo hydrolysis to yield either a molecule of ADP (adenosine diphosphate) and inorganic phosphate or a molecule of AMP (adenosine monophosphate) and pyrophosphate. Both these reactions yield a large amount of energy (about 30.6 kJ $mol^{-1}$) that is used to bring about such biological processes as muscle contraction, the active transport of ions and molecules across cell membranes, and the synthesis of biomolecules. The reactions bringing about these processes often involve the enzyme-catalyzed transfer of the phosphate group to intermediate substrates. Most ATP-mediated reactions require $Mg^{2+}$ ions as cofactors. ATP is regenerated by the rephosphorylation of AMP and ADP using the chemical energy obtained from the oxidation of food. This takes place during glycolysis and the Krebs cycle but, most significantly, is also a result of the reduction-oxidation reactions of the electron transport chain, which ultimately reduces molecular oxygen to water (oxidative phosphorylation). (see: Concise Science Dictionary, Oxford University Press, Oxford, 1988).

The aforementioned conditions and processes in accordance with the present invention preferentially select for enhanced growth of the limestone depositing organisms typical of the coral reef ecological community in comparison to the non-limestone skeleton depositing organisms typical of stressed or polluted conditions affecting reefs as well as shore defence structures and mariculture facilities.

C. Accreted substrate, re-applied substrate, chemical changes, growth of organisms and structures.

To illustrate the use of substrate and altered chemical conditions in the substrate and the electrolyte for accelerated and regular growth of organisms to produce useful structures, devices, and installations, examples involving an artificial reef, a coastal defence structure, a device for shellfish cultivation, and a specimen for use in aquaria or for seeding purposes in other areas will be described.

As used herein, "substrate" refers to a nonstructural or structural material, which accretes on the cathode. It serves to anchor sessile organisms, or provides a surface to rest on, walk on, or cling to. "Substrate" also refers to accreted material which has been taken from a cathode, plasticized, its chemical composition altered, and is reapplied to a cathode.

"Substrate" also refers to a mainly calcareous material which provides the natural mineral layer for settlement and growth of organisms which deposit skeletons or shells made of limestone, or which are in part composed of limestone. High pH and high electron conditions are produced at the cathode. Alkaline conditions convert dissolved sea water bicarbonate ions into carbonate ions, thereby causing supersaturation of calcium carbonate, resulting in the deposition of limestone minerals (aragonite and calcite, containing magnesium). Organisms which grow limestone skeletons or shells are more efficient at their formation because less metabolic energy is needed to create the right alkaline conditions at the site of growth.

Also, the inventors consider that the same organisms, but equally those without limestone skeletons or shells, may grow faster in or on the substrate or in the vicinity of the cathode because additional electrons are made available to provide energy to cells through the biochemical electron transport chain, increasing the organisms' metabolic efficiency since less organic matter needs to be oxidized in order to provide electrons to furnish biochemical energy for ATP production.

Also, in accordance with the invention, all kinds of organisms on the substrate or in the vicinity of the cathode may be more efficient at uptake and internal transport of essential dissolved cations such as calcium, magnesium, and other dissolved elements because of the increased availability of electrons for co-transport or counter-transport across cell membranes.

These described conditions, together with the substrate, generate a dynamic growing limestone structure which is capable of forming an ecosystem, of serving as a coastal defence structure, of providing live marine organisms for aquaria and depleted or destroyed marine habitats, of providing sand for beach renourishment, primarily through the rapid growth and breakup of calcareous algae, and of effecting higher yields in mariculture, or culture of organisms in containers or tanks.

According to the invention, these structures a. can cement themselves to the sea floor b. are fastened to the sea floor by bolts or pegs; or c. are ballasted by materials like rocks or stones, or bags filled with sand or other materials.

The elevation of the structures and the food provided by the limestone skeleton depositing community provides a preferred shelter for free-swimming organisms such as fish, squid etc.

Because the generation of the substrate and the electrochemical conditions brought about thereby are more similar to a growing natural reef than any other form of artificial reef, it is the most suitable process to construct, restore, repair, and maintain reefs.

According to one aspect of the invention, all types of reefs, atolls, barrier reefs, fringing reefs, and patch reefs can be mitigated.

Furthermore, according to another aspect of the present invention, reefs can be established in areas where natural reefs did not exist before.

Structures can be situated and grown so as to form a hydraulic relief system to absorb the energy of ocean currents and waves. The erosive and destructive energy of a roller at Bikini, for instance, is estimated to be about 500,000 hp. A relatively small artificial reef, as described herein, could absorb most of this energy.

If the cathode material does not consist of relatively corrosion-resistant substances (titanium, titanium/mixed metal oxides, carbon, graphite), but, for instance, materials like iron or steel, being galvanized or not, corrosion occurs when electricity is cut off, although accreted minerals around the former cathode maintain for some time alkaline conditions which inhibit oxidation and limit the access of oxygen to the former cathode. When cathodic protection has ceased, oxidation will take place, which can endanger the structural integrity of the reef or other structures and devices. Therefore, according to one aspect of the present invention, an electrical current can be re-established between the electrodes to re-form the original cathodic material from oxidation products, and to provide again alkaline conditions in the accreted mineral layer. Furthermore, the stimulation of marine life in the vicinity of the cathode takes place again.

In preferred embodiments of the invention, the anode is situated close to the cathode in order to minimize electrical losses due to the resistance of the electrolyte. However, hydrochloric acid generated at the anode has to be kept from reaching the cathode.

Acidic conditions inhibit the growth of aquatic organisms. According to locally prevailing conditions like ocean current and wave patterns, the anode can be bottom-mounted or suspended in the water column, depending also on the desired thickness and composition of the substrate. The anode is preferably located so that any substantial water flows occur from the cathode towards the anode, and not vice versa, in order to mimimize passage of acidic electrolyte (containing hydrochloric acid in ionic or dissociated form) from the anode to the cathode. Preferably the anode is located above or beside the cathode. When the cathode comprises a structure which encloses a space, the anode should not be located inside that space.

"Electrical power supply" implies the provision of the electrodes with direct current from power nets using transformers or, according to a preferred aspect of the invention, with electrical current from photovaltaic devices, wind-driven installations, or other energy sources.

The DC power range applied to the electrodes is between 0.001 W and 4000 W per square meter cathode metal surface. The current density may suitably be in the range 0.1–30 amperes per square meter cathode metal area. Voltage is preferably low e.g. above 1.2 volts, preferably in the range 3–15 volts, more preferably 6–12 volts.

In performing the invention, there may be periods while no electricity is supplied to the reefs, structures, and devices. Also, electricity can be applied in an intermittent or pulsed manner, preferably at a higher current so that the wattage achieved over a certain time period is generally equivalent to that of a steady current over the same period.

The method of invention can be used over a wide range of electrolyte temperatures, depending upon the location and the type of aquatic organism whose growth is to be enhanced. Temperatures in the range −5° C. to 50° C. or even 80° C. may be suitable in particular circumstances. For growth of coral, a temperature in the range 12° to 30° C. is preferred, more particularly 20° to 28° C.

DESCRIPTION OF THE PREFERRED EMBODIMENTS

The method of the invention is carried out using various arrangements of cathode and anode as illustrated in FIGS. 2–8, to which direct electric current is applied to effect electrolysis. Each of the structures is immersed in sea water unless otherwise mentioned, and mineral material accretes on the cathode during electrolysis.

Figure 2:
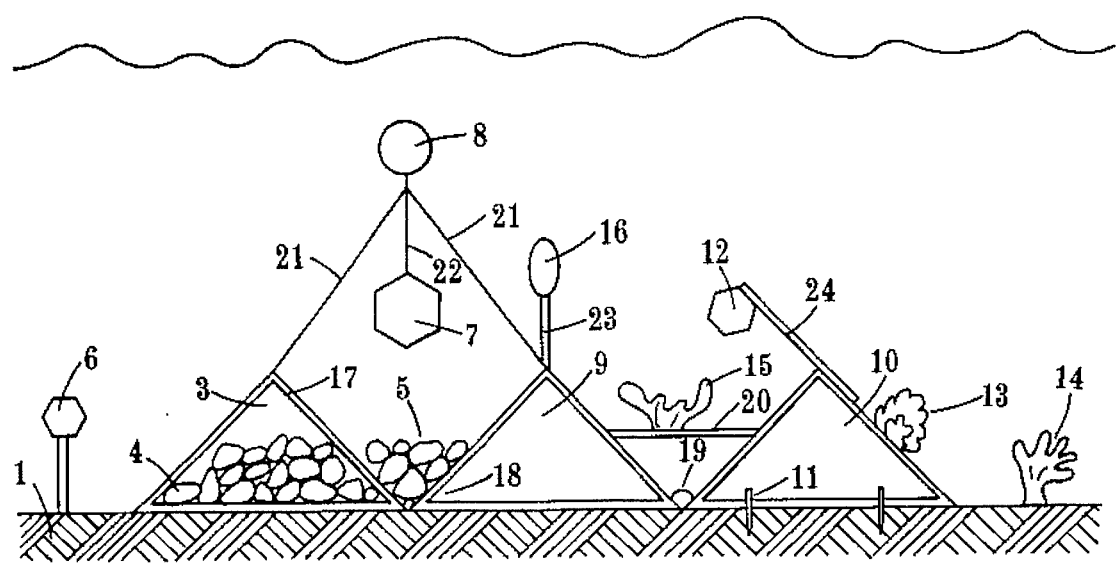
FIG. 2 is a cross-sectional view of an artificial reef with cathode compartments and hard coral growth on it and in its vicinity. The anodes are floating-type and bottom-mounted.

Referring to FIG. 2 there is shown in a cross-sectional view, an artificial reef, consisting mainly of three triangular prismatic structures 3, 9, 10 which are cathodes with attached substrate 17. Several alternative embodiments are shown in FIG. 2 for purposes of illustration.

The reef is mounted on the sea floor 1. Structure 3 is held to the sea floor by ballast stones, rocks, or sandbags 4 inside the structure, and partially by similar ballast placed at its outside 5. Structure 9 has no internal ballast. It is mechanically and electrically connected at 18,19 to structures 3 and 10. Structure 10 is bolted to the sea floor 11. Anode 6 is bottom-mounted, anode 7 is suspended by a cable and/or rope or metal or plastic rod 22 hanging from a submerged flotation device 8, which is tethered by ropes 21, which are connected to structures 3 and 9. Anode 12 is fastened to a plastic holder 24 which is attached to structure 10. The horizontal connection 20 between structures 9 and 10 consists of electrically conductive or non-conductive material. On it, coral 15 and other organisms are settling and growing, as are colonies or corals 13 on the substrate 17 and in the vicinity 14. A light 16, attached by a rod 23 to structure 9, attracts food at night for use by the reef community.

Figure 3:
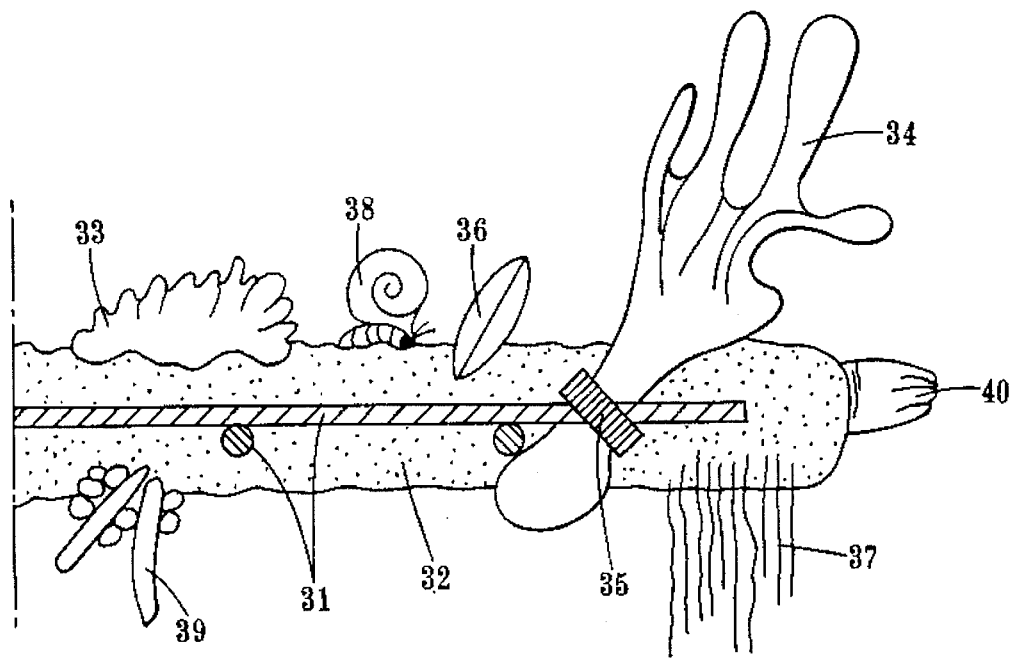
FIG. 3 is a detailed close-up vertical-sectional view of parts of a cathode, electrodeposited material, growing coral, tubeworms, snails, bivalves and algae.

Referring now to FIG. 3, there is shown part in section of a cathode 31 with accreted substrate 32 attached to it. The living coral piece 34 is fastened to the cathode 31 before or during the accretion process by a plastic or rubber holder or metal wire 35. In and on the substrate 32 settle and grow various organisms like hard and soft corals 33, 34, bivalves 36, algae 37, snails 38, and tubeworms 39 as well as barnacles 40.

Figure 4:
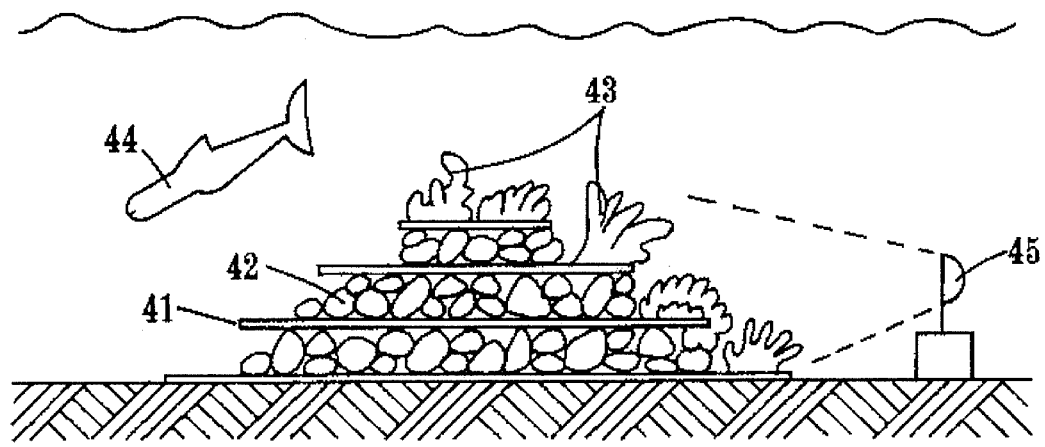
FIG. 4 is a cross-sectional view of a structure consisting mainly of cathodic mats, rocks and growing coral.

FIG. 4 shows in cross-sectional view a coastal defence structure or foundation for an artificial island, in which layers of cathodic mats 41 are interspersed with layers of rock, rubble, sandbags, or coral 42. While cementation of materials 41 and 42 occurs, making the structure stiff and firm, coral 43 and other organisms grow on the mats 41 and filler material 42. Fish 44 and other free-swimming species find shelter and food in and around the structure. Bottom-mounted light sources 45 attract food for the community at night.

Figure 5:
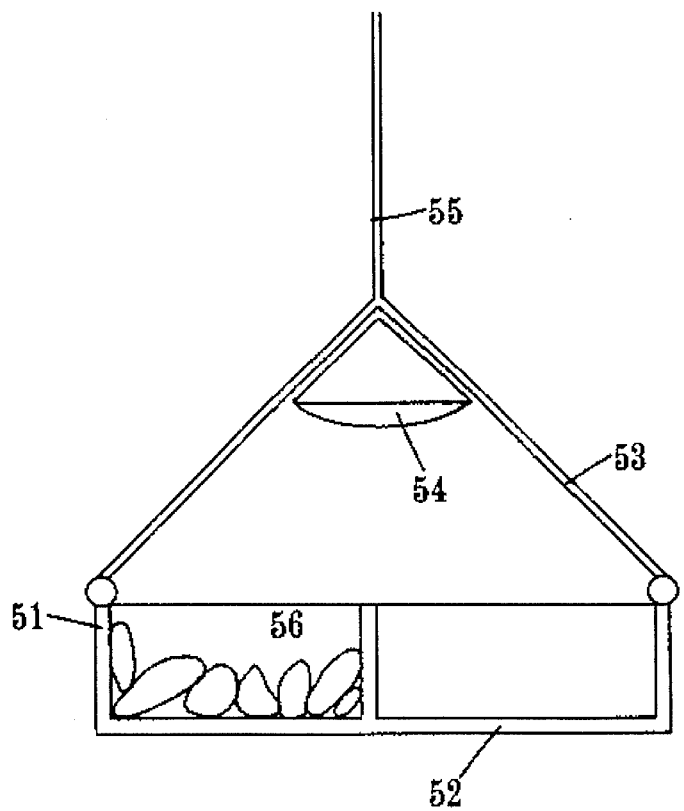
FIG. 5 is a cross-sectional view of a rack utilized for the cultivation of oysters, mussels, or other organisms.

FIG. 5 depicts a sectional view of a rack utilized for cultivation of oyster, mussel, or other shellfish 56. The rack consists of vertical 51 and horizontal 52 cathodic materials on which is mounted a rope construct 53 embodying a light source 54 which attracts food at night. Attached to the construct 53 is the suspension and lifting rope 55. An anode (not shown) is suspended nearby.

Figure 6:
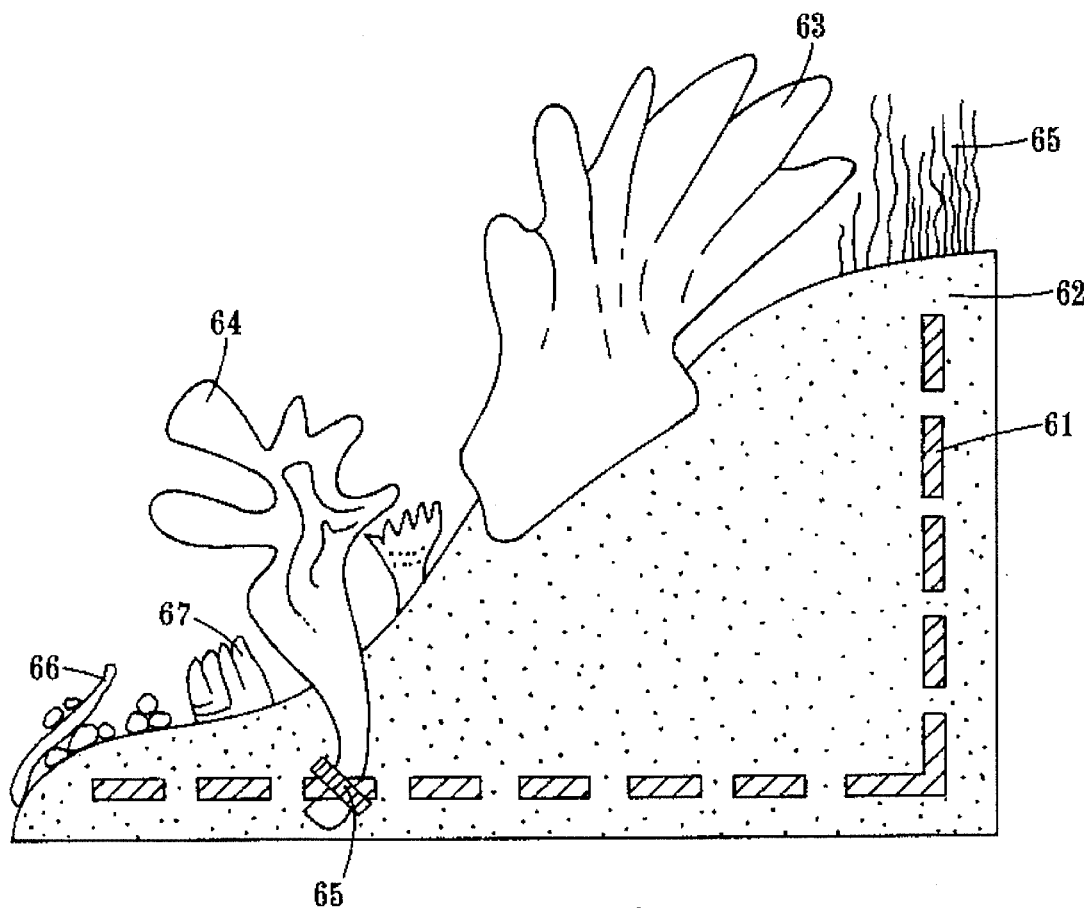
FIG. 6 depicts a cross-sectional view of a structure consisting of a cathode, to which accreted and subsequently plasticized, altered and shaped material has been applied, with growing organisms.

FIG. 6 shows in a sectional view a specimen consisting of a cathode 61 covered by and containing accreted minerals 62 which were produced on other cathodes, removed, plasticized, chemically altered, and applied to the cathode 61. Living marine organisms like hard or soft coral 64 are grafted onto the cathode by plastic or metal fastener 65. Subsequent exposure in the open ocean or in tanks leads to settlement of the specimen by organisms like hard and soft corals 63, algae 65, tubeworms 66, barnacles 67, and anemones 68. The examples of grafted or transplanted and recruited organisms given is not exclusive; many other species may settle and grow on the described specimen.

The utilization of these specimens is primarily in the aquarium trade and in the task to repopulate marine areas with marine organisms, or to establish new reefs, as well as to restore damaged reefs.

Figure 7:
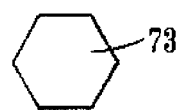
FIG. 7 is a diagrammatic elevation of a cathodic grid on which gastropods are growing.
Figure 7:
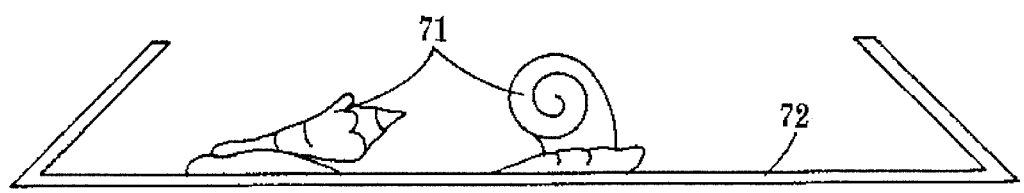

FIG. 7 shows gastropods 71 grazing and resting on a cathodic grid 72, which is positioned on the ocean floor. The anode 73 is mounted above the cathode. By use of the present invention, gastropods will develop and mature more rapidly under these conditions.

EXAMPLE 1

Figure 8:
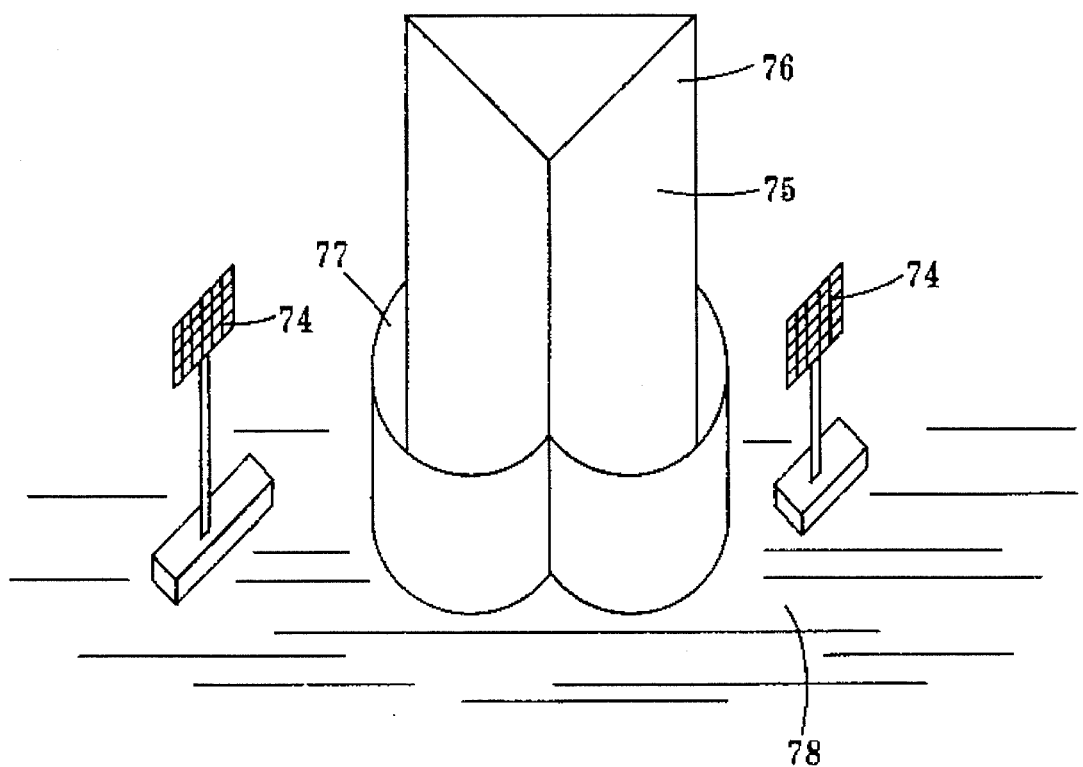
FIG. 8 is a diagrammatic projection of an installation used in performing the invention.

An artificial reef was created at Discovery Bay, Jamaica, in sea water having an average water temperature of 26° C. A cathode of expanded metal was installed below the surface in the water as illustrated in FIG. 8. The cathode 75 comprised a prismatic structure having three rectangular walls 76 each 4 ft. wide and 8 ft. high defining a triangular space between them, and three semi-circular pockets 77, one in front of each wall 76, and each having a base. The walls 76, pockets 77 and bases were all formed of expanded metal, the various components being secured together by wire. The total metal mesh area was approximately 160 sq. ft., of which the metal occupied 50–60%. The pockets were loaded with ballast (not shown) e.g. limestone and/or coral fragments. The cathode stood on a limestone surface 78. Several anodes 74 were suspended at a distance of 1—3 meters from the cathode 75. A direct current was applied across the cathode and anodes at 0.2–0.8 amperes per sq. meter of cathode metal area. The current was applied continuously for a period of fourteen months and intermittently for periods totalling about twenty months, during an overall time of sixty months. Crystalline $CaCO_3$ (limestone) and $Mg(OH_2)$ (Brucite) accreted on the single layer cathode, reaching a thickness of 15 cm in various locations. The cathode 75 had become attached by accretion to the limestone surface 78 and the ballast had been fixed by accretion in the pockets. Various species of hard and soft corals, as well as various species of algae settled the accreted substrate spontaneously.

Samples of various live coral species were attached to the cathode as shown in FIG. 3. Growth of the corals was recorded on videotape and photographic slides. By comparing the size of colonies in images taken at different times, it is clear that the growth rate of the branching corals *Acropora cervicornis* and *Porites furcata* is around 1 centimeter per month or more. This value, 12 or more centimeters per year, measured in fairly turbid inshore water conditions, dramatically exceeds the growth rates of 7.1 centimeters per year in *Acropora cervicornis* or of 4.7 to 9.9 cm/year in *Acropora palmata* (the most rapidly growing Caribbean corals) reported from clear-water offshore reefs north of St. Croix (E. Gladfelter, R. Monahan, & W. Gladfelter, 1978, Growth rates of five reef-building corals in the northeastern Caribbean, Bulletin of Marine Science, 28: 728–734). Those published growth rates are no longer representative as both species have virtually vanished from the U.S. Virgin Islands and Puerto Rico since their net growth in those areas now is less than the rate at which they are being damaged by hurricanes, diseases, and algae overgrowth caused by eutrophication. Comparison between *Porites furcata* colonies on the artificial reef at Discovery Bay and the parent colonies from which these were derived, growing on rocks nearby, shows that colonies on the artificial reef grew from around 5 to 10 cm diameter to over 30 cm in a year and a half, while the parent colonies remained the same size or were killed by algae overgrowth. In this case the increase in growth rate on the artificial reef was vast, stimulating colonies which were genetically identical to those that had negative growth without electrical stimulation to probably the most rapid growth every seen in this species. Similarly the massive round coral *Porites astreoides* grew from around 10 cm to 20 cm in a year and a half on the artificial reef, greatly exceeding the growth rate of 3.0 to 3.5 cm/year reported by Gladfelter et al. Enhanced growth rates are also being observed in other species on the artificial reefs. These colonies also feed more actively, show greater polyp tentacle extension, and are more pigmented than corals of the same species nearby not receiving electricity.

Corals transplanted onto the structure largely consisted of colonies which were naturally broken by storms, anthropogenically damaged corals whose bases were so bio-eroded that they would soon be broken by storms, and small pieces of branching corals broken off nearby "control" colonies, where available. In most cases damaged corals healed quickly, were cemented solidly onto the mineral accretion within weeks, showed bright healthy tissue pigmentation, showed prolific polyp feeding tentacle extension, and grew skeletons at rates comparable to the highest values measured in the field, even though all sites had sub-optimal water quality. Some corals have been killed by bristle worm attack, and some broken in severe storms. Young corals spontaneously settle and grow on the mineral accretion. Except for specimens of most species of Caribbean corals and a few sea fans, all other organisms deliberately transplanted onto the structures were small organisms encrusting coral bases.

A highly diverse coral reef community has settled onto or migrated to the mineral accretion structures, including foraminifera, cyanobacteria, chlorophytes, rhodophytes, phaeophytes, porifera, hydrozoans, cerianthids coralliomopharia, gorgonaceans, sabellid, serpulid, and nereid polychaetes, oysters, gastropods, octopods, echinoids, holothurians, ophiuroids, crinoids, cleaning shrimp, crabs, hermit crabs, and spiny lobsters. A large variety of adult and juvenile fish have been permanent or temporary residents, including morays, trumpetfish, squirrelfish, seabass, fairy basslets, cardinalfish, grunts, drums, butterfish, angelfish, damselfish, wrasses, parrotfish, blennies, gobies, surgeonfish, filefish, and porcupinefish. The geometry of the structure appears to strongly affect the type of species recruited. Dolphins have been observed swimming near the structures.

The main difference between the artificial reefs of the invention, and nearby natural reef are the preponderance of fleshy algae overgrowing corals on natural reefs, yet the artificial reefs have balanced coral and algae growth, and algae are predominantly sand-producing calcareous reds and greens. The method is able to partly counteract eutrophication due to coastal zone nutrient fertilization, and so contribute to restoring damaged reefs and creating new ones in even moderately degraded areas. As the structures become stronger with age, they are also able to contribute more and more to shore protection from waves and keeping pace with rising sea level.

EXAMPLE 2

Artificial reefs in Negril, Jamaica have been undergoing mineral accretion since late 1993, and most corals were transplanted in mid to late 1994. The project by the present inventors in accordance with the invention is part of a joint Global Coral Reef Alliance and Negril Coral Reef Preservation Society reef restoration programme. The reefs are powered from shore by direct electrical current via cables. Electricity use of both reefs together has largely been low, only 40 watts, but was turned up in mid January 1995 to about 150 watts, giving each as much power as a 75 watt light bulb. Corals transplanted onto the artificial reef were for the most part small branches, corals which were broken loose by storms, or small head corals whose bases had been heavily bored and would eventually break off. A few algae, sponges, etc. were attached to the dead bases of some corals but almost all organisms seen have voluntarily migrated to the artificial reef or settled on it. Organisms we have seen in and around the artificial reefs include a large variety of juvenile and adult fish, moray eels, crabs, lobsters, octopus, squid, sponges, sand-producing algae, sea urchins, sea cucumbers, dolphins, etc. The only organisms which appear less abundant than on the nearby reefs are the "weeds", fleshy algae that are overgrowing and killing corals because of excessive nutrient levels from inadequately treated sewage entering the sea from land. The inventors have recorded on videotape the extremely healthy and rapidly growing corals on the artificial reef and the complex mini-reef ecosystem that springs up around them. Growth of the underlying limestone structure makes these artificial reefs continuously heavier and stronger as they get older, unlike any other material. When storm breakage occurs, renewed electrical input makes them self-repairing. The artificial reefs can be built in any shape and powered from purely renewable energy sources like solar photovoltaic panels or windmills.

EXAMPLE 3

During an underwater construction project in the Missisipi Delta using electrolysis in accordance with the invention, oysters have been observed to grow at enhanced rates on cathodically-produced mineral substrate as measured against control groups growing under normal local conditions.

The foregoing description of the invention has been directed to a particular substrate and electrochemical conditions in the electrolyte involving growth of marine organisms for purposes of explanation and illustration. It will be appparent, however, to those skilled in this art, that modifications and changes may be made in the method outlined without departing from the scope and spirit of the invention. It is the applicants' intention in the following claims to cover such equivalent modifications and changes as fall within the scope of the invention as defined by the following claims.

We claim:

1. A method of enhancing growth of aquatic organisms in an aqueous mineral-containing electrolyte which comprises:
   (a) installing a cathode and an anode in the electrolyte,
   (b) applying a steady, pulsed or intermittent direct electric current across the cathode and the anode to effect electrolysis,
   (c) providing accreted mineral material on the cathode,
   (d) recruiting aquatic organisms on or in the vicinity of the cathode, and
   (e) creating by electrolysis conditions of higher alkalinity in the electrolyte in the vicinity of the cathode than in the electrolyte remote from the cathode to cause growth of the aquatic organisms in the conditions in the vicinity of the cathode, the placement of the anode being done in such a way as to minimize the effects of hydrochloric acid produced at the anode.

2. A method according to claim 1 wherein the mineral-containing electrolyte is selected from sea water, brackish water or brine.

3. A method according to claim 1 wherein the accreted mineral material is deposited on the cathode by the electrolysis.

4. A method according to claim 1 wherein the accreted mineral material is pre-fabricated material which has been electrodeposited previously and which is fixed to the cathode.

5. A method according to claim 1 wherein the cathode is seeded with the aquatic organisms.

6. A method according to claim 1 wherein the cathode is settled naturally by the aquatic organisms.

7. A method according to claim 1 wherein the aquatic organisms are organisms which deposit calcareous substances.

8. A method according to claim 7 wherein the organisms are selected from corals and calcareous algae.

9. A method according to claim 7 wherein the organisms are selected from bivalves, worms, protozoans, sponges and crawling organisms including snails and echinoderms.

10. A method according to claim 1 wherein artificial lighting is used adjacent to the cathode to attract food.

11. A method of creating conditions of increased electron availability for the biochemical electron transport chain of aquatic organisms in an aqueous mineral-containing electrolyte which comprises:
    (a) installing a cathode and an anode in the electrolyte,
    (b) applying a steady, pulsed or intermittent direct electric current across the cathode and the anode to effect electrolysis,
    (c) providing accreted mineral material on the cathode,
    (d) recruiting aquatic organisms on or in the vicinity of the cathode, and
    (e) creating by electrolysis conditions of higher alkalinity in the electrolyte in the vicinity of the cathode than in the electrolyte remote from the cathode to cause growth of the aquatic organisms in the conditions in the vicinity of the cathode, the placement of the anode being done in such a way as to minimize the effects of hydrochloric acid produced at the anode.

12. A method for the construction, repair and maintenance of structures in an aqueous mineral-containing electrolyte which comprises:
    (a) installing a cathode and an anode in the electrolyte,
    (b) applying a steady, pulsed or intermittent direct electric current across the cathode and the anode to effect electrolysis,
    (c) providing accreted mineral material on the cathode,
    (d) recruiting aquatic organisms which deposit calcareous substances on or in the vicinity of the cathode,
    (e) creating by electrolysis conditions of higher alkalinity in the electrolyte in the vicinity of the cathode than in the electrolyte remote from the cathode to cause growth of the aquatic organisms in the conditions in the vicinity of the cathode, the placement of the anode being done in such a way as to minimize the effects of hydrochloric acid produced at the anode, and
    (f) accumulating deposited calcareous substances on or in the vicinity of the cathode to form, repair or maintain a structure on or in the vicinity of the cathode.

13. A method of enhancing growth of aquatic organisms in an aqueous mineral-containing electrolyte which comprises:
    (a) installing a cathode and an anode in the electrolyte,
    (b) applying a steady, pulsed or intermittent direct electric current across the cathode and the anode to effect electrolysis,
    (c) providing accreted mineral material on the cathode,
    (d) recruiting aquatic organisms on or in the vicinity of the cathode, and
    (e) creating by electrolysis conditions of relatively high alkalinity and relatively high electron availability at the cathode (compared to the electrolyte remote from the cathode) so that the aquatic organisms grow in these conditions.

* * * * *